United States Patent
Otsuka

(10) Patent No.: US 10,049,069 B2
(45) Date of Patent: Aug. 14, 2018

(54) INFORMATION PROCESSING APPARATUS, INFORMATION PROCESSING METHOD, AND RECORDING MEDIUM

(71) Applicant: FUJITSU LIMITED, Kawasaki-shi, Kanagawa (JP)

(72) Inventor: Hiroshi Otsuka, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 147 days.

(21) Appl. No.: 14/851,165

(22) Filed: Sep. 11, 2015

(65) Prior Publication Data

US 2016/0117280 A1 Apr. 28, 2016

(30) Foreign Application Priority Data

Oct. 23, 2014 (JP) ................................. 2014-216395

(51) Int. Cl.
  *G06F 13/42* (2006.01)
  *G06F 13/40* (2006.01)
  *G06F 13/00* (2006.01)
  *G06F 3/06* (2006.01)

(52) U.S. Cl.
  CPC ...... *G06F 13/4022* (2013.01); *G06F 13/4221* (2013.01)

(58) Field of Classification Search
  None
  See application file for complete search history.

(56) References Cited

U.S. PATENT DOCUMENTS

| | | | |
|---|---|---|---|
| 2003/0018756 A1 | 1/2003 | Nguyen et al. | |
| 2006/0190611 A1* | 8/2006 | Miyazaki | G06F 3/0605 709/229 |
| 2013/0212345 A1* | 8/2013 | Nakajima | G06F 3/0605 711/161 |

FOREIGN PATENT DOCUMENTS

| | | |
|---|---|---|
| JP | 10-70491 | 3/1998 |
| JP | 2000-209623 | 7/2000 |
| JP | 2007-88905 | 4/2007 |
| JP | 2008-148023 | 6/2008 |

OTHER PUBLICATIONS

Notification of Reasons for Refusal issued in corresponding Japanese Application No. 2014-216395 dated Jun. 12, 2018.

* cited by examiner

*Primary Examiner* — Scott Sun
(74) *Attorney, Agent, or Firm* — Oblon, McClelland, Maier & Neustadt, L.L.P.

(57) ABSTRACT

An information processing apparatus that includes a plurality of ports, selectively connects one of the plurality of ports, and is interconnected to a plurality of an apparatuses via the plurality of ports, the information processing apparatus includes a memory configured to store therein zoning information indicating a connection relationship between the plurality of ports; and a processor coupled to the memory and configured to issue, based on the zoning information, at least one of a first instruction for instructing to announce in a visually confirmable manner by using an indicator arranged so as to correspond to one or more of the plurality of ports and a second instruction for instructing to transmit an announcement command signal used for requesting an apparatus coupled to the information processing apparatus to announce a port of the apparatus in a visually confirmable manner.

9 Claims, 16 Drawing Sheets

FIG. 4

| DOMAIN ID:3 ||
|---|---|
| ZONE NUMBER | PORT NUMBER |
| #1 | 1,5 |
| #2 | 2,5 |
| #3 | 3,7 |

FIG. 5

| DOMAIN ID:4 | |
|---|---|
| ZONE NUMBER | PORT NUMBER |
| #1 | 11:11:11:11:11:11:11:22;22:22:22:22:22:22:22:44 |
| #2 | 11:11:11:11:11:11:11:44;22:22:22:22:22:22:22:44 |
| #3 | 11:11:11:11:11:11:11:66;22:22:22:22:22:22:22:66 |

INFORMATION PROCESSING APPARATUS, INFORMATION PROCESSING METHOD, AND RECORDING MEDIUM

CROSS-REFERENCE TO RELATED APPLICATION

This application is based upon and claims the benefit of priority of the prior Japanese Patent Application No. 2014-216395, filed on Oct. 23, 2014, the entire contents of which are incorporated herein by reference.

FIELD

The embodiments discussed herein are related to an information processing apparatus, an information processing method, and a recording medium.

BACKGROUND

In an information processing system in which information processing apparatuses such as a switch, a server, and a storage device are coupled using cables, a host bus adapter (HBA) mounted in the switch and the server each include ports and light emission diodes (LEDs) each corresponding to one of the ports. In addition, the switch, the server, and the storage device each have a beacon function of blinking an LED corresponding to a specified port out of ports. As related arts, for example, Japanese Laid-open Patent Publication No. 2008-148023, Japanese Laid-open Patent Publication No. 2007-88905, Japanese Laid-open Patent Publication No. 10-70491, and Japanese Laid-open Patent Publication No. 2000-209623 are disclosed.

In recent years, in the above-mentioned information processing system, an operation form, in which an operation is started in a system whose size is limited to a minimum (called a small start) and the size of the system is gradually extended (called scale-out), has been generally performed. From this trend, a case of newly connecting a device to a system via a cable or the like increases in number. If this device newly added to the system is not correctly coupled, it is difficult for the system to normally function. Therefore, it is desirable that, at the time of extending the system, it is possible to easily confirm whether the added device is correctly coupled.

SUMMARY

According to an aspect of the invention, an information processing apparatus that includes a plurality of ports, selectively connects one of the plurality of ports, and is interconnected to a plurality of an apparatuses via the plurality of ports, the information processing apparatus includes a memory configured to store therein zoning information indicating a connection relationship between the plurality of ports; and a processor coupled to the memory and configured to issue, based on the zoning information, at least one of a first instruction for instructing to announce in a visually confirmable manner by using an indicator arranged so as to correspond to one or more of the plurality of ports and a second instruction for instructing to transmit an announcement command signal used for requesting an apparatus coupled to the information processing apparatus to announce a port of the apparatus in a visually confirmable manner.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a portion of zoning information according to port zoning;

FIG. 5 is a diagram illustrating an example of a portion of zoning information according to WWN zoning;

DESCRIPTION OF EMBODIMENTS

Hereinafter, embodiments of the present technology will be specifically described with reference to FIG. 1 to FIG. 15.

First Example

Figure 1:
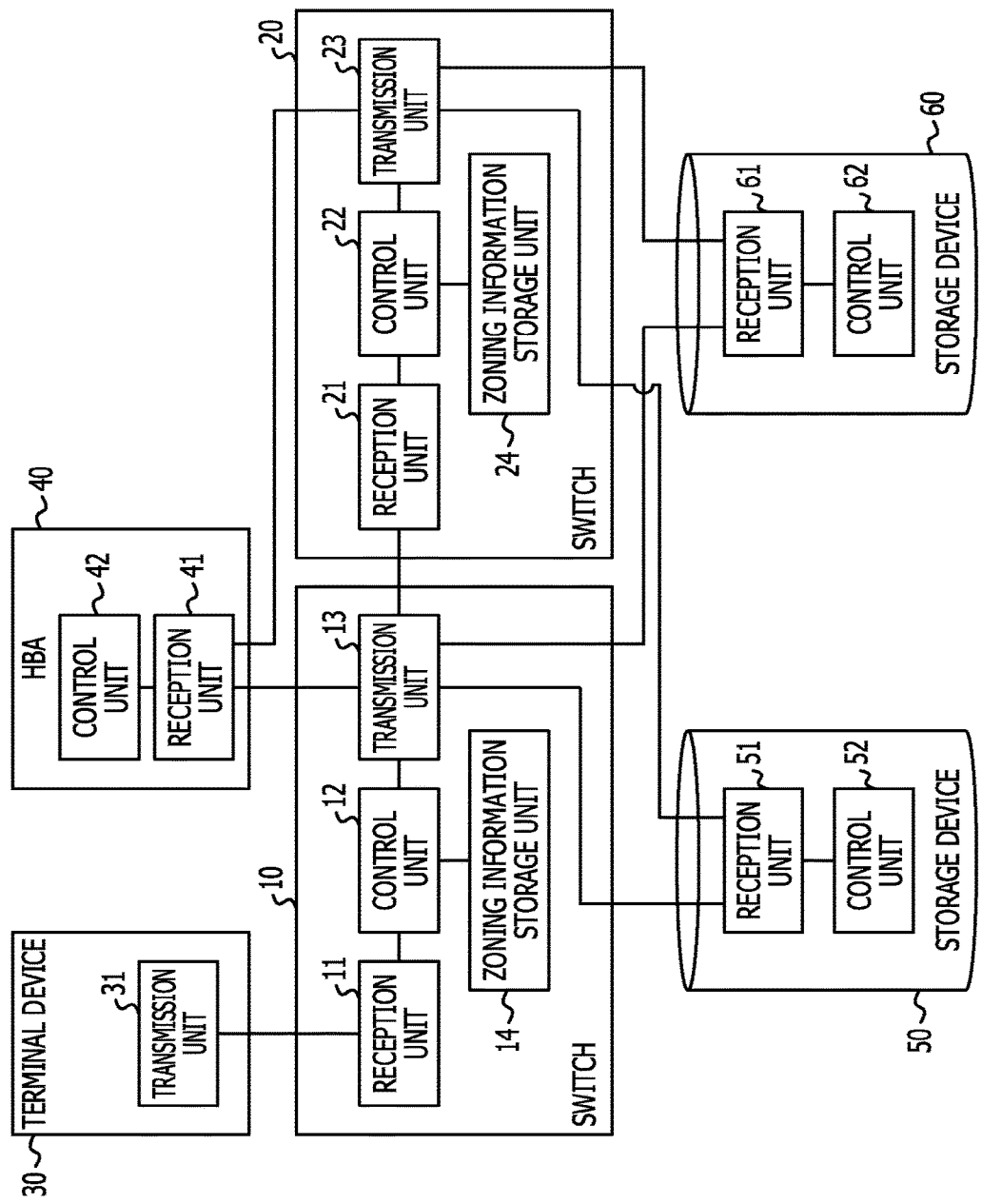
FIG. 1 is a diagram illustrating an example of a configuration of an information processing system according to a first example.

FIG. 1 is a diagram illustrating an example of a configuration of an information processing system according to a first example. As illustrated in FIG. 1, the information processing system is configured by information processing apparatuses and includes a switch 10, a switch 20, a terminal device 30, an HBA 40, a storage device 50, and a storage device 60. The terminal device 30, the HBA 40, the storage device 50, and the storage device 60 are coupled so as to be communicatable with one another via the switch 10 or the switch 20.

Each of the switches 10 and 20 is a communication device that has a switching function for lines or packets and that relays data transmission. The switches 10 and 20 are also called fiber channel (FC) switches. The switches 10 and 20 are examples of the information processing apparatuses. A method for processing performed by each of the switches 10 and 20 will be described later.

The terminal device 30 is a terminal used by an operator to input a command to the switch 10 and is, for example, a smartphone, a mobile phone, a notebook personal computer (PC), a desktop PC, a tablet terminal, or the like. The terminal device 30 is coupled to the switch 10 via, for example, a local area network (LAN) cable.

The HBA 40 is mounted in, for example, a server and is hardware used for connecting to peripheral devices. In the example of FIG. 1, the HBA 40 is coupled to the switch 10. The HBA 40 is an interface card such as, for example, a small computer system interface (SCSI), a fiber channel, or a serial advanced technology attachment (serial ATA). The HBA 40 is an example of an apparatus.

Each of the storage devices 50 and 60 is a storage device capable of being accessed, via the switch 10 or 20, by the terminal device 30 of the operator or the server equipped with the HBA 40. It is possible for each of the storage devices 50 and 60 to store therein data provided in response to a request from, for example, the operator and data, programs, or the like used for various kinds of processing. The storage devices 50 and 60 are, for example, network attached storages (NASs). The storage devices 50 and 60 are examples of apparatuses.

Each of the HBA 40 and the storage devices 50 and 60 is coupled, via ports provided therein, to other apparatuses by using cables, thereby constructing a network. Each of the cables is, for example, a fiber cable, a copper line cable, or the like. Hereinafter, a connection configuration of the information processing system will be described.

Figure 2:
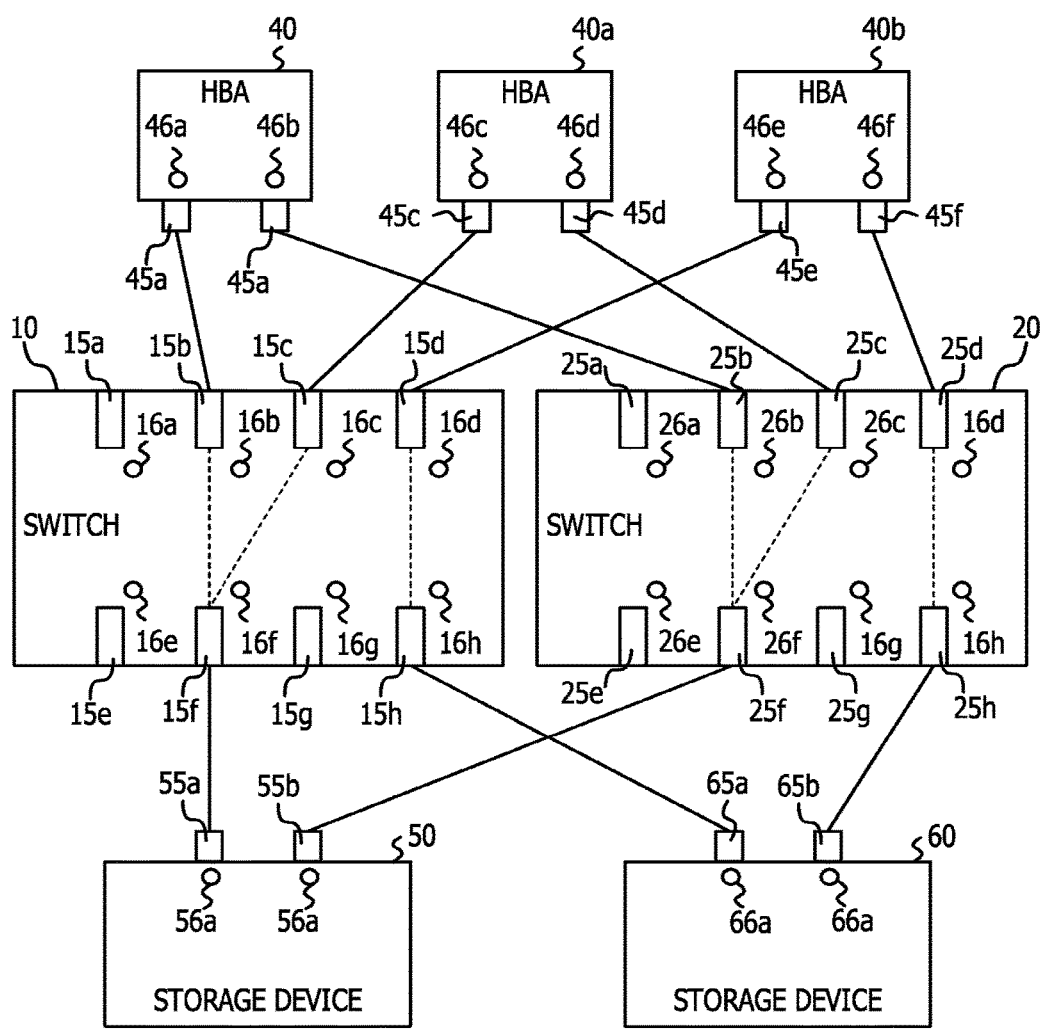
FIG. 2 is a diagram illustrating an example of a connection configuration of the information processing system.

FIG. 2 is a diagram illustrating an example of the connection configuration of the information processing system. The information processing system includes the switch 10, the switch 20, the HBA 40, an HBA 40a, an HBA 40b, the storage device 50, and the storage device 60. In FIG. 2, common symbols are assigned to the same information processing apparatuses as the individual information processing apparatuses illustrated in FIG. 1.

The switch 10 includes ports 15a, 15b, 15c, 15d, 15e, 15f, 15g, and 15h. Furthermore, the switch 10 includes LEDs corresponding to these respective ports on a one-to-one basis. An LED 16a is arranged as an LED corresponding to the port 15a, and an LED 16b is arranged as an LED corresponding to the port 15b. An LED 16c is arranged as an LED corresponding to the port 15c, and an LED 16d is arranged as an LED corresponding to the port 15d. An LED 16e is arranged as an LED corresponding to the port 15e, and an LED 16f is arranged as an LED corresponding to the port 15f. An LED 16g is arranged as an LED corresponding to the port 15g, and an LED 16h is arranged as an LED corresponding to the port 15h.

The switch 20 includes ports 25a, 25b, 25c, 25d, 25e, 25f, 25g, and 25h. Furthermore, the switch 20 includes LEDs corresponding to these respective ports on a one-to-one basis. A LED 26a is arranged as an LED corresponding to the port 25a, and an LED 26b is arranged as an LED corresponding to the port 25b. An LED 26c is arranged as an LED corresponding to the port 25c, and an LED 26d is arranged as an LED corresponding to the port 25d. An LED 26e is arranged as an LED corresponding to the port 25e, and an LED 26f is arranged as an LED corresponding to the port 25f. An LED 26g is arranged as an LED corresponding to the port 25g, and an LED 26h is arranged as an LED corresponding to the port 25h. Each of the above-mentioned LEDs provided in the switch 10 and the switch 20 is an example of an announcement unit that announces the position of a port in a visually confirmable manner.

The HBA 40 includes ports 45a and 45b. Furthermore, the HBA 40 includes LEDs corresponding to these respective ports on a one-to-one basis. A LED 46a is arranged as an LED corresponding to the port 45a, and an LED 46b is arranged as an LED corresponding to the port 45b.

The HBA 40a includes ports 45c and 45d. Furthermore, the HBA 40a includes LEDs corresponding to these respective ports on a one-to-one basis. A LED 46c is arranged as an LED corresponding to the port 45c, and an LED 46d is arranged as an LED corresponding to the port 45d.

The HBA 40b includes ports 45e and 45f. Furthermore, the HBA 40b includes LEDs corresponding to these respective ports on a one-to-one basis. A LED 46e is arranged as an LED corresponding to the port 45e, and an LED 46f is arranged as an LED corresponding to the port 45f. Each of the above-mentioned LEDs provided in the HBA 40, the HBA 40a, and the HBA 40b is an example of the announcement unit.

The storage device 50 includes ports 55a and 55b. Furthermore, the storage device 50 includes LEDs corresponding to these respective ports on a one-to-one basis. A LED 56a is arranged as an LED corresponding to the port 55a, and an LED 56b is arranged as an LED corresponding to the port 55b.

The storage device 60 includes ports 65a and 65b. Furthermore, the storage device 60 includes LEDs corresponding to these respective ports on a one-to-one basis. A LED 66a is arranged as an LED corresponding to the port 65a, and an LED 66b is arranged as an LED corresponding to the port 65b. Each of the above-mentioned LEDs provided in the storage devices 50 and 60 is an example of the announcement unit.

In FIG. 2, connections based on cables are illustrated by solid lines, and selective connections between ports within switches are illustrated by dashed lines.

The port 15b of the switch 10 is coupled to the port 45a of the HBA 40 by a cable and is coupled to the port 15f within the switch 10. The port 15c of the switch 10 is coupled to the port 45c of the HBA 40a by a cable and is coupled to the port 15f within the switch 10. The port 15d of the switch 10 is coupled to the port 45e of the HBA 40b by a cable and is coupled to the port 15h within the switch 10. The port 15f of the switch 10 is coupled to the port 55a of the storage device 50 by a cable, and the port 15h of the switch 10 is coupled to the port 65a of the storage device 60 by a cable.

The port 25b of the switch 20 is coupled to the port 45b of the HBA 40 by a cable and is coupled to the port 25f within the switch 20. The port 25c of the switch 20 is coupled to the port 45d of the HBA 40a by a cable and is coupled to the port 25f within the switch 20. The port 25d of the switch 20 is coupled to the port 45f of the HBA 40b by a cable and is coupled to the port 25h within the switch 20. The port 25f of the switch 20 is coupled to the port 55b of the storage device 50 by a cable, and the port 25h of the switch 20 is coupled to the port 65b of the storage device 60 by a cable.

In what follows, embodiments will be described under the assumption that the operator possesses, for each of connection paths within the information processing system, information of all ports configuring the relevant connection path, the relevant information is correct, and the operator confirms the presence or absence of an erroneous connection of a cable by comparing the relevant information with an actual connection state.

Next, hardware configurations of the switches 10 and 20 will be described.

Figure 3:
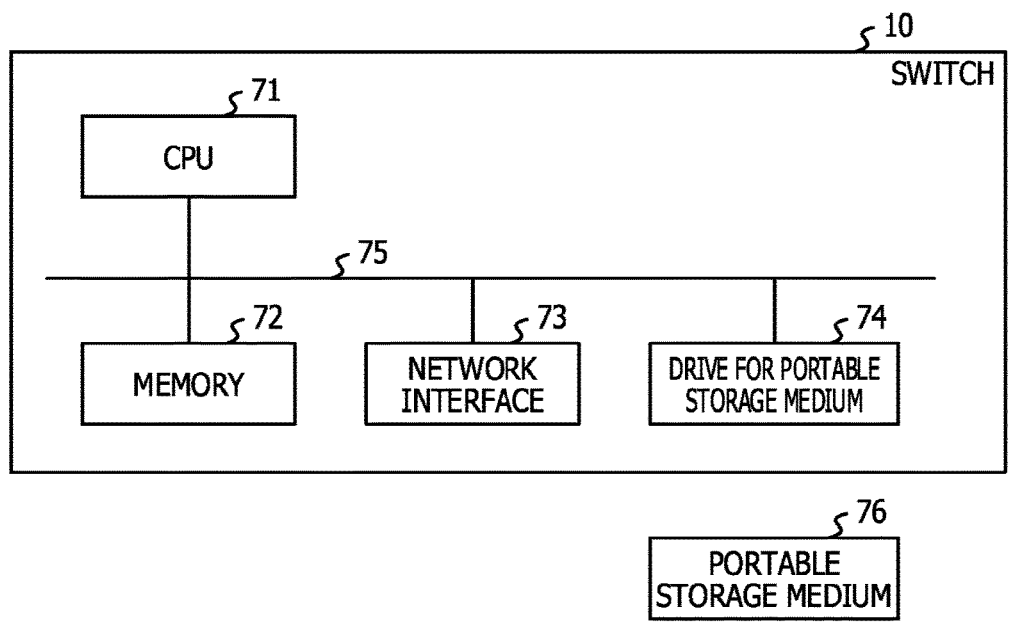
FIG. 3 is a diagram illustrating an example of hardware configurations of switches.

FIG. 3 is a diagram illustrating an example of the hardware configurations of the switches 10 and 20. As illustrated in FIG. 3, the switch 10 includes a central processing unit (CPU) 71, a memory 72, a network interface 73, and a drive 74 for a portable storage medium.

The individual units in the configuration of the switch 10 are coupled to a bus 75. The memory 72 is, for example, a random access memory (RAM), a flash memory, or a read only memory (ROM) and may be any combination of these. For example, the RAM and a NAND-type flash memory may be used for storing data. On the other hand, a NOR-type flash memory and the ROM may be used for storing programs. The network interface 73 is hardware used for performing communication between apparatuses. The network interface 73 may be realized by, for example, an interface card or a semiconductor device in which a function of a communication interface is embedded. The network interface 73 is able to be provided with a function corresponding to a reception unit 11, a reception unit 21, a transmission unit 13, or a transmission unit 23, illustrated in FIG. 1. In addition, in a case where the interface card is used as the network interface 73, sockets provided in the interface card may be used as ports. On the other hand, in a case where the semiconductor device is used as the network interface 73, the semiconductor device is electrically coupled to ports via lines provided in a mother board.

In the switch 10, a processor such as the CPU 71 executes programs (including an information processing program) stored in the memory 72 or the storage device 60 or programs (including the information processing program) read from a portable storage medium 76 by the drive 74 for a portable storage medium, thereby realizing the function of the switch 10. The relevant programs may be loaded in the memory 72 and executed by the processor such as the CPU 71. The switch 20 has the same hardware configuration as that of the switch 10. Therefore, the description of the switch 20 will be omitted.

Returning to FIG. 1, functions of individual units configuring the information processing system will be described.

The terminal device 30 specifies a port from among ports provided in the switch 10 and transmits a blinking (or turn-off) instruction command serving as an instruction for blinking an LED corresponding to the specified port. In what follows, a port specified by the terminal device 30 is called a specified port.

The switch 10 includes the reception unit 11, a control unit 12, the transmission unit 13, and a zoning information storage unit 14. The control unit 12 is coupled to the reception unit 11, the transmission unit 13, and the zoning information storage unit 14. Hereinafter, the individual units in the switch 10 will be described.

The reception unit 11 is coupled to a transmission unit 31 in the terminal device 30 and receives the blinking (or turn-off) instruction command, used for a corresponding LED of the switch 10 and transmitted from the terminal device 30. The blinking (or turn-off) instruction command includes, for example, information of a command port and information of an operation mode indicating a pattern of a blinking range of LEDs, which are specified by the operator of the terminal device 30.

Based on information of the specified port and the information of the operation mode indicating a pattern of the blinking range of LEDs, which are included in the received blinking (or turn-off) instruction command, the control unit 12 identifies, from among the ports provided in the switch 10, a related port coupled to the specified port. In addition, the control unit 12 is able to issue a control instruction, used for blinking or turning off an LED corresponding to the specified port or the related port, to a control unit (not illustrated) that manages operation control of the relevant LED. The relevant control instruction is an example of a first instruction. In addition, in order to cause the transmission unit 13 to transmit an announcement command signal used for requesting a peripheral device to announce the position of a port on the peripheral device's side in a visually confirmable manner, the peripheral device being coupled to the specified port or the related port, the control unit 12 is able to issue a transmission instruction to the transmission unit 13. The relevant transmission instruction is an example of a second instruction. The details of the operation mode and processing performed by the control unit 12 will be described later. The control unit 12 is realized by, for example, the CPU 71 in FIG. 3 or a processor such as a micro-processing unit (MPU).

The transmission unit 13 is coupled to the reception unit 21 in the switch 20, a reception unit 41 in the HBA 40, a reception unit 51 in the storage device 50, and a reception unit 61 in the storage device 60. Based on the transmission instruction received from the control unit 12, the transmission unit 13 generates the announcement command signal. In addition, the transmission unit 13 is able to transmit the generated announcement command signal to at least one of the switch 20, the HBA 40, the storage device 50, and the storage device 60. The transmission unit 13 and the reception unit 11 are able to be realized by the same hardware. As the announcement command signal, for example, a frame in which a request for blinking (or turning off) an LED is encapsulated may be used. However, the announcement command signal only has to be a signal for blinking or turning off an LED in a peripheral device and is not limited to the frame.

The zoning information storage unit 14 stores therein zoning information used for processing in the control unit 12. The zoning information storage unit 14 corresponds to, for example, the memory 72, the drive 74 for a portable storage medium, or the portable storage medium 76 in FIG. 3.

Here, the zoning information will be described. The information processing system is divided into a number of zones for individual connection paths within the information processing system by switches. In addition, the switches 10 and 20 each have a function called zoning in which if a connection path is set as a zone, access to another zone and access from another zone are limited. The zoning based on the combination of port numbers of the switches 10 and 20 is called port zoning. On the other hand, the zoning based on the combination of world wide names (WWNs) is called WWN zoning.

In a case of using the port zoning, the combination of port numbers having a connection relationship with one another is defined as a zone. In addition, the combination of port numbers for each of zones is stored, as the zoning information, in the zoning information storage units 14 and 24 in the switches 10 and 20.

FIG. 4 is a diagram illustrating an example of a portion of the zoning information according to the port zoning. FIG. 4 illustrates the zoning information of the information processing system illustrated in FIG. 2. A domain ID is an identifier for identifying a switch. "3" is assigned, as the domain ID, to the switch 10, and "4" is assigned, as the domain ID, to the switch 20. In addition, a port number is set for each of the ports of the switches 10 and 20. The port numbers of the ports 15a and 25a are "0", and the port numbers of the ports 15b and 25b are "1". The port numbers of the ports 15c and 25c are "2", and the port numbers of the ports 15d and 25d are "3". The port numbers of the ports 15e and 25e are "4", and the port numbers of the ports 15f and 25f are "5". The port numbers of the ports 15g and 25g are "6", and the port numbers of the ports 15h and 25h are "7". FIG. 4 is an example of a setting in a switch whose domain ID is "3", and in FIG. 4, a zone #1 including the combination of the port numbers of "1" and "5", a zone #2 including the combination of the port numbers of "2" and "5", and a zone #3 including the combination of the port numbers of "3" and "7" are set.

On the other hand, in a case of using the WWN zoning, a different WWN is assigned to each of ports of a peripheral device coupled to a switch, and the combination of WWNs having a connection relationship with one another is defined as a zone. In addition, the combination of WWNs for each of zones is stored, as the zoning information, in the zoning information storage units 14 and 24 in the switches 10 and 20.

FIG. 5 is a diagram illustrating an example of a portion of the zoning information according to the WWN zoning. FIG. 5 illustrates the zoning information of the information processing system illustrated in FIG. 2. In FIG. 5, a WWN is set for each of peripheral devices coupled to the switches 10 and 20. For example, "11:11:11:11:11:11:11:22" is set as the WWN of the HBA 40, "11:11:11:11:11:11:11:44" is set as the WWN of the HBA 40a, and "11:11:11:11:11:11:11:66" is set as the WWN of the HBA 40b. "22:22:22:22:22:22:22:44" is set as the WWN of the storage device 50, and "22:22:22:22:22:22:22:66" is set as the WWN of the storage device 60. FIG. 5 is an example of a setting in a switch whose domain ID is "4", and in FIG. 5, a zone #1 including the combination of the WWN of the HBA 40 and the WWN of the storage device 50, a zone #2 including the combination of the WWN of the HBA 40a and the WWN of the storage device 50, and a zone #3 including the combination of the WWN of the HBA 40b and the WWN of the storage device 60 are set.

If being coupled to a peripheral device having a WWN by using a cable, each of the switches 10 and 20 is able to recognize a port of the device itself, coupled thereto. Accordingly, in a case of using the WWN zoning, by storing, in the zoning information storage unit 14 or 24, information of ports of the device itself, previously acquired when cables were correctly coupled, each of the switches 10 and 20 is able to use the information as the zoning information.

The zoning information is information indicating some of connection paths at the time of connecting apparatuses to one another by using cables. Therefore, if there is an error in the relevant information, it becomes difficult to confirm false detection of a cable. In what follows, embodiments will be described under the assumption that the zoning information stored in the relevant zoning information storage unit 14 or 24 is accurate information.

Returning to FIG. 1, the switch 20 includes the reception unit 21, a control unit 22, the transmission unit 23, and the zoning information storage unit 24. The control unit 22 is coupled to the reception unit 21, the transmission unit 23, and the zoning information storage unit 24. A function performed by the switch 20 is substantially the same as a function performed by the switch 10. Hereinafter, the individual units in the switch 20 will be described.

The reception unit 21 is coupled to the transmission unit 13 in the switch 10 and receives an announcement command signal transmitted from the switch 10. The reception unit 21 is able to receive a blinking (or turn-off) instruction command, used for a corresponding LED of the switch 20 and transmitted from the terminal device 30.

In the same way as the control unit 12, based on information of a command port and an operation mode, included in the received announcement command signal, the control unit 22 is able to issue a control instruction, used for blinking or turning off an LED corresponding to a specified port or a reception port, to a control unit (not illustrated) that manages operation control of the relevant LED. In addition, in order to cause the transmission unit 23 to transmit an announcement command signal used for requesting a peripheral device to announce the position of a port on the relevant device's side in a visually confirmable manner, the peripheral device being coupled to the switch 20, the control unit 22 is able to issue a transmission instruction to the transmission unit 23. The details of processing performed by the control unit 22 will be described later. The control unit 22 is realized by, for example, the CPU 71 in FIG. 3 or a processor such as an MPU.

Based on the transmission instruction for the announcement command signal, received from the control unit 22, the transmission unit 23 is able to transmit the announcement command signal to the storage device 60. The transmission unit 23 and the reception unit 21 are able to be realized by the same hardware.

The zoning information storage unit 24 stores therein zoning information used for processing in the control unit 22. In the zoning information storage unit 24, the same zoning information as the zoning information stored in the zoning information storage unit 14 is stored. In other words, regardless of using the port zoning or the WWN zoning, the zoning information stored in each of the zoning information storage units 14 and 24 includes connection information relating to all switches configuring the information processing system. In the same way as the zoning information storage unit 14, the zoning information storage unit 24 is realized by, for example, the memory 72, the drive 74 for a portable storage medium, or the portable storage medium 76 in FIG. 3.

At the time of updating the zoning information, the operator performs update processing via the terminal device 30. Using, for example, dedicated frames, individual switches having the zoning information are able to exchange the update information of the zoning information with one another at predetermined time intervals, thereby continuously maintaining the zoning information so that the zoning information is the same information. According to the above-mentioned configuration, even in a case of a zone including switches coupled in a multistage manner, it is possible to identify a port belonging to the relevant zone by using the zoning information included in each of the switches. Therefore, it becomes possible to blink not only an LED corresponding to a port of an apparatus coupled to a switch in a first stage but also an LED coupled to a switch in a subsequent stage.

The HBA 40 includes the reception unit 41 and a control unit 42. Hereinafter, the individual units in the HBA 40 will be described.

The reception unit 41 is coupled to the transmission unit 13 in the switch 10 and the transmission unit 23 in the switch 20 so as to be communicatable with each other and receives a blinking (or turn-off) instruction command, used for a corresponding LED of the HBA 40 and transmitted from the switch 10. The reception unit 41 is able to receive a blinking (or turn-off) instruction command, used for a corresponding LED of the HBA 40 and transmitted from the switch 20. The reception unit 41 is realized by, for example, the network interface 73 in FIG. 3.

In the same way as the control units 12 and 22, based on information of a command port and an operation mode, included in the received blinking (or turn-off) instruction command, the control unit 42 blinks or turns off an LED corresponding to a specified port or a reception port and performs processing according to the operation mode, such as causing a peripheral device to transmit an announcement command signal. The details of processing performed by the control unit 42 will be described later. The control unit 42 is realized by, for example, the CPU 71 in FIG. 3 or a processor such as an MPU. In the same way as the switch 10, the HBA 40 is able to include a transmission unit (not illustrated) that transmits an announcement command signal.

The storage device 50 includes the reception unit 51 and a control unit 52. Hereinafter, the individual units in the storage device 50 will be described.

The reception unit 51 receives a blinking instruction command, used for a corresponding LED of the storage device 50 and transmitted from the switch 10. The reception unit 51 is able to receive a blinking (or turn-off) instruction command, used for a corresponding LED of the storage device 50 and transmitted from the switch 20.

In the same way as the control units 12, 22, and 42, based on information of a command port and an operation mode, included in the received blinking (or turn-off) instruction command, the control unit 52 blinks or turns off an LED corresponding to a specified port or a reception port and performs processing according to the operation mode, such as causing a peripheral device to transmit an announcement command signal. The details of processing performed by the control unit 52 will be described later. The control unit 52 is realized by, for example, the CPU 71 in FIG. 3 or a processor such as an MPU. In the same way as the switch 10, the storage device 50 is able to include a transmission unit that transmits an announcement command signal.

The storage device 60 includes the reception unit 61 and a control unit 62. Hereinafter, the individual units in the storage device 60 will be described.

The reception unit 61 receives a blinking (or turn-off) instruction command, used for a corresponding LED of the storage device 60 and transmitted from the switch 20. The reception unit 61 is able to receive a blinking (or turn-off) instruction command, used for a corresponding LED of the storage device 60 and transmitted from the switch 10.

In the same way as the control units 12, 22, 42, and 52, based on information of a specified port and an operation mode, included in the received blinking (or turn-off) instruction command, the control unit 62 blinks or turns off an LED corresponding to the specified port or a reception port and performs processing according to the operation mode, such as causing a peripheral device to transmit an announcement command signal. The details of processing performed by the control unit 62 will be described later. The control unit 62 is realized by, for example, the CPU 71 in FIG. 3 or a processor such as an MPU. In the same way as the switch 10, the storage device 60 is able to include a transmission unit that is able to transmit an announcement command signal.

Next, an information processing method based on the information processing system will be described with reference to FIG. 1.

Figure 6:
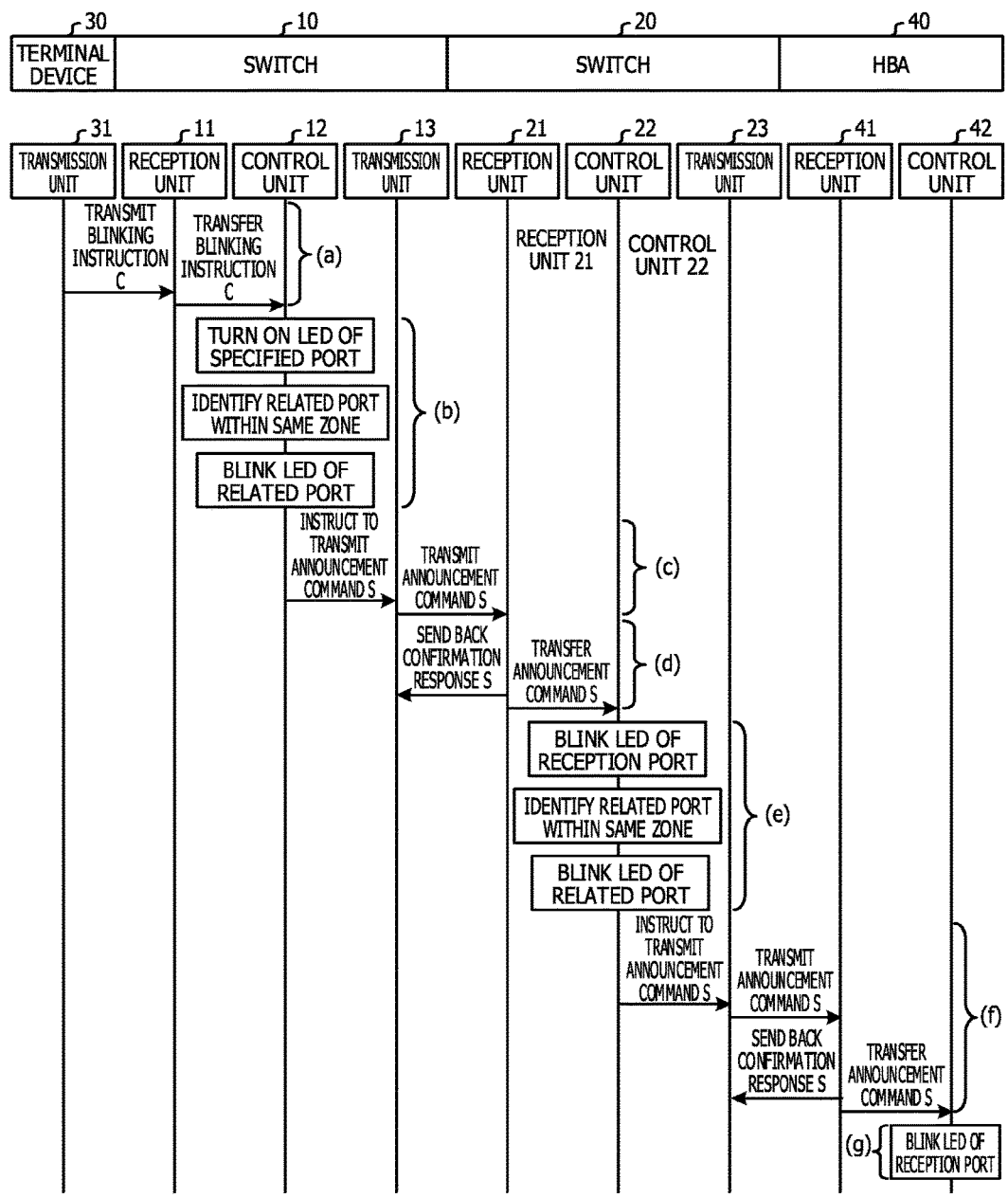
FIG. 6 is a sequence diagram according to an example of an information processing method based on the information processing system.

FIG. 6 is a sequence diagram according to an example of the information processing method based on the information processing system. Here, an example of blinking LEDs will be described. In FIG. 6, "C" indicates a command, and "S" indicates a signal.

First, as illustrated by (a) in FIG. 6, the terminal device 30 transmits a blinking instruction command serving as an instruction for blinking a corresponding LED from the transmission unit 31 to the reception unit 11 in the switch 10. In this processing, the operator of the terminal device 30 inputs a blinking instruction command to the terminal device 30 by using a command line interface (CLI). At that time, the operator is able to specify, as arguments of the command, a specified port and a pattern of a blinking range of the corresponding LED. In the present embodiment, the operator is able to select the pattern of the blinking range of the corresponding LED from among four types of operation mode. Hereinafter, four types of operation mode will be described using the information processing system illustrated in FIG. 2.

Figure 7:
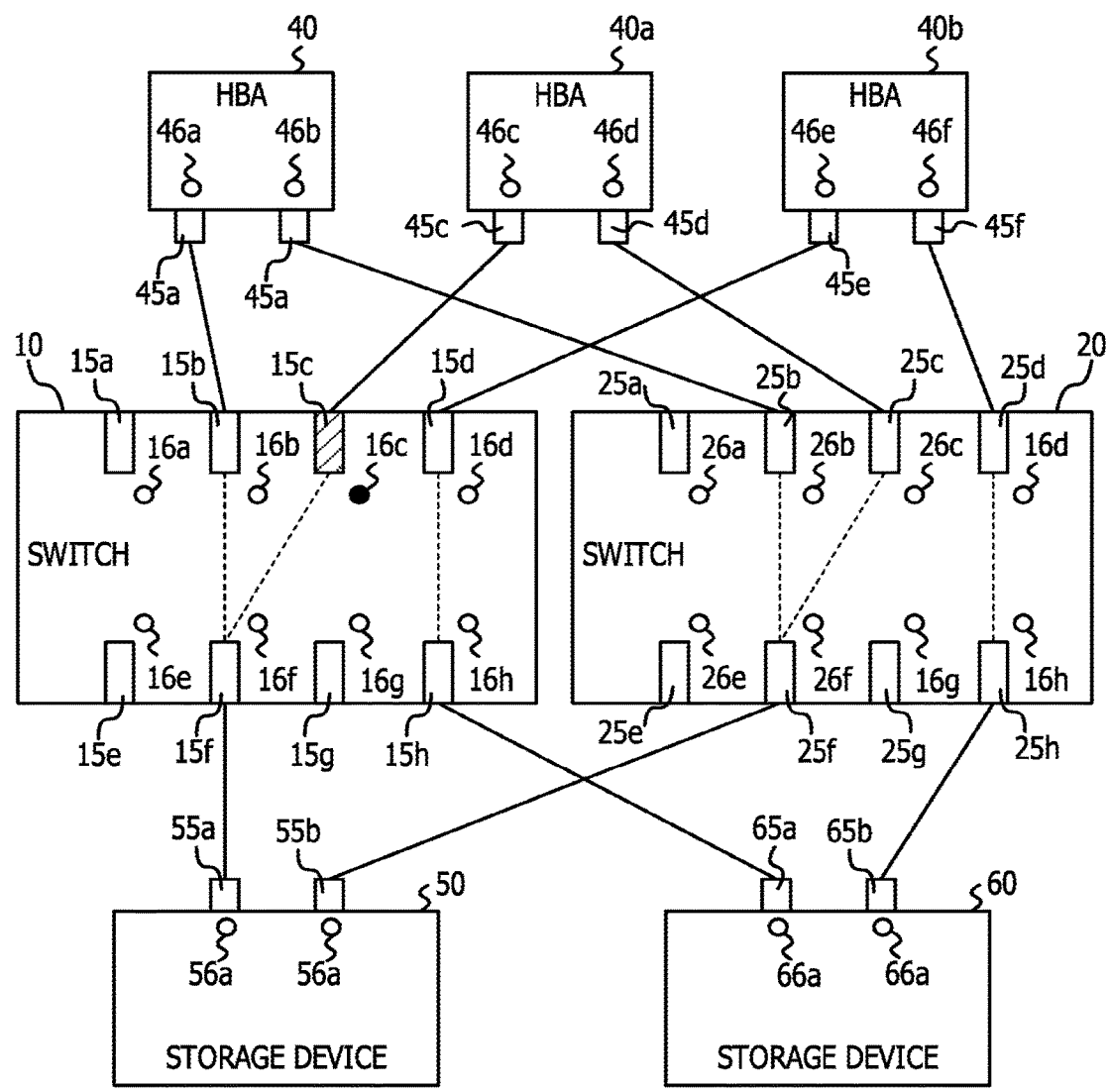
FIG. 7 is a diagram illustrating an example (a first operation mode) of a blinking range of LEDs.
Figure 8:
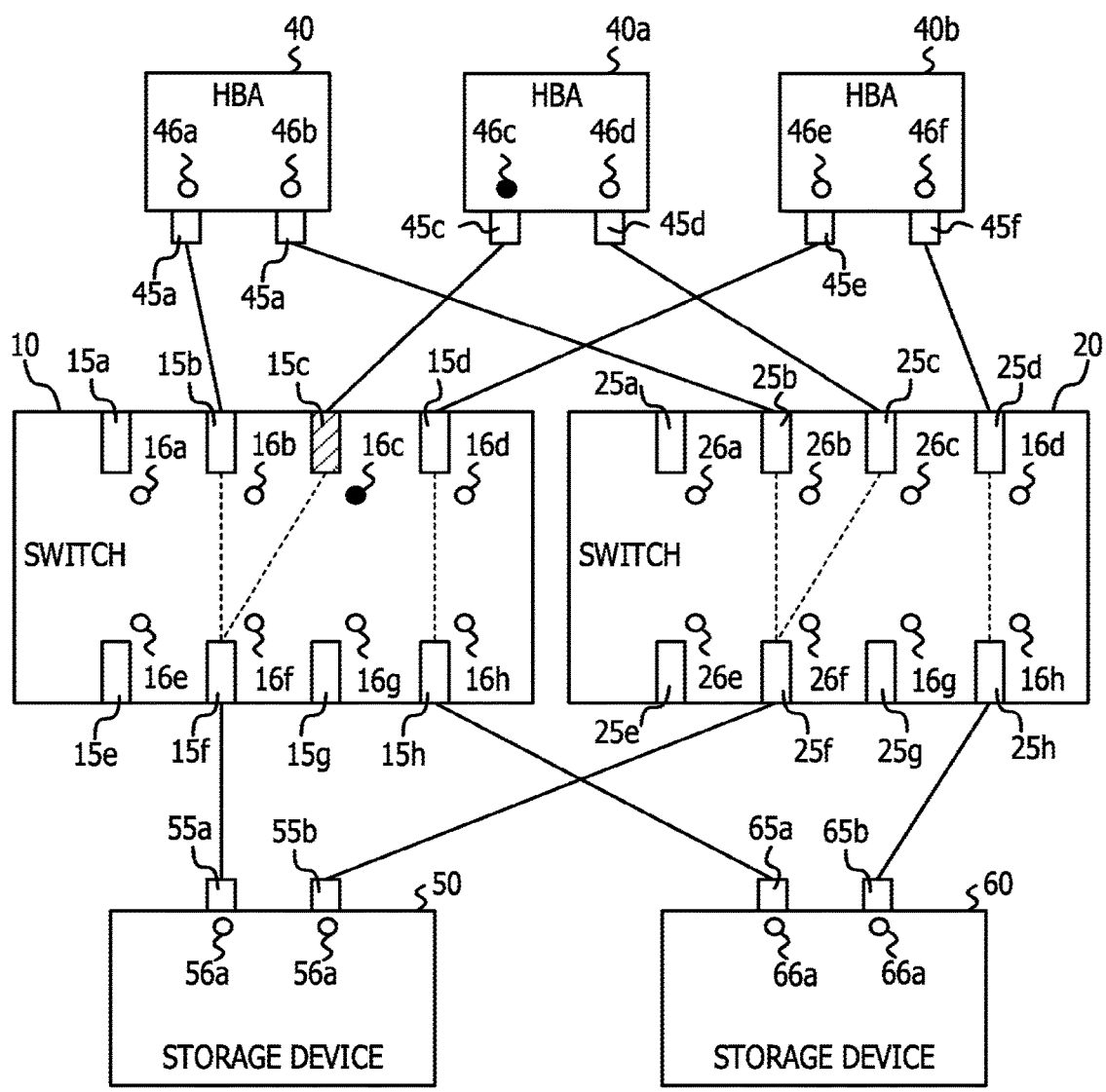
FIG. 8 is a diagram illustrating an example (a second operation mode) of a blinking range of LEDs.
Figure 9:
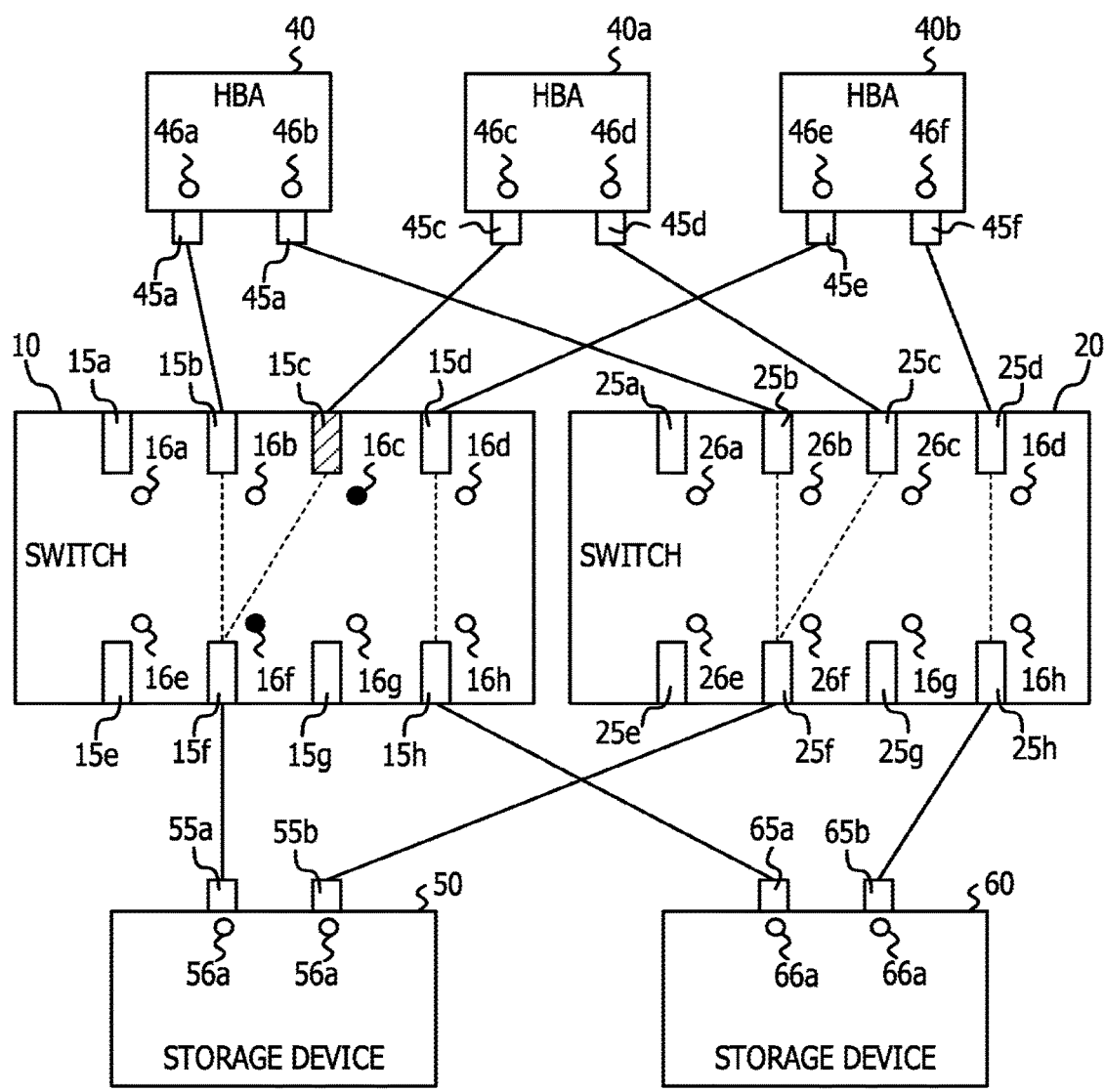
FIG. 9 is a diagram illustrating an example (a third operation mode) of a blinking range of LEDs.
Figure 10:
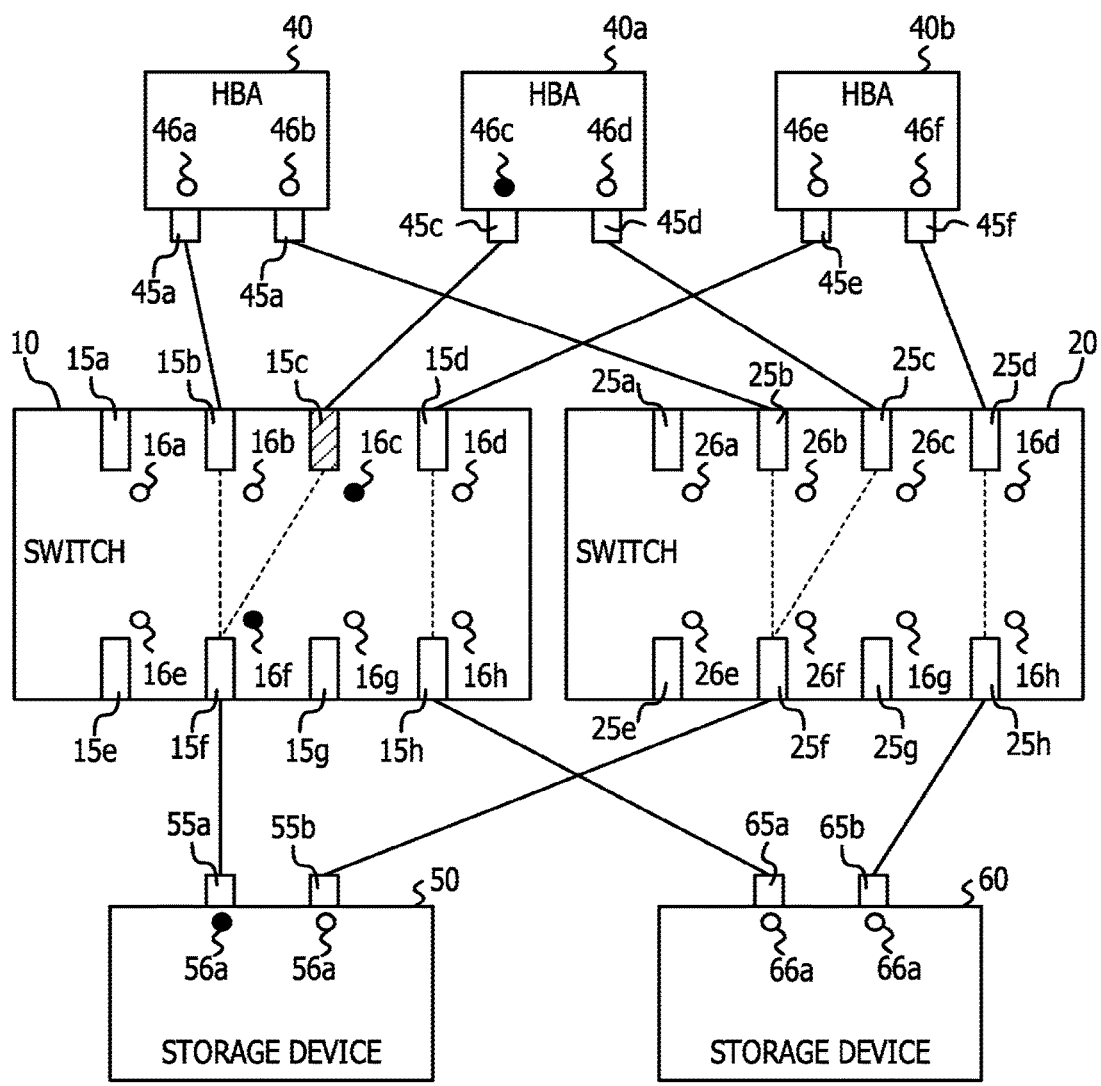
FIG. 10 is a diagram illustrating an example (a fourth operation mode) of a blinking range of LEDs.

FIG. 7 is a diagram illustrating an example (an operation mode 1) of a blinking range of LEDs. A while circle indicates a state in which an LED is turned off, a black circle indicates a state in which an LED blinks, and the same applies to FIG. 8 to FIG. 10, illustrated hereinafter. A specified port is indicated by diagonal lines, and the same applies to FIG. 8 to FIG. 10, illustrated hereinafter. The "operation mode 1" is a mode in which only an LED corresponding to the specified port is blinked.

According to the "operation mode 1", as illustrated in FIG. 7, in a case where the operator selects, as the specified port, the port 15c of the switch 10, the switch 10 blinks the LED 16c corresponding to the port 15c. According to the "operation mode 1", the operator is able to identify the position of the specified port.

FIG. 8 is a diagram illustrating an example (an operation mode 2) of a blinking range of LEDs. The operation mode 2 is a mode in which an LED corresponding to the specified port and an LED corresponding to a port of a peripheral device are blinked, the port of the peripheral device serving as a connection destination of the specified port.

According to the "operation mode 2", as illustrated in FIG. 8, in a case where the operator selects, as the specified port, the port 15c of the switch 10, the switch 10 blinks the LED 16c corresponding to the port 15c and the LED 46c corresponding to the port 45c of the HBA 40a, which serves as the connection destination of the port 15c. According to the "operation mode 2", the operator is able to identify the position of the specified port and the position of a port on a peripheral device's side, the port on the peripheral device's side being to be coupled to the specified port.

FIG. 9 is a diagram illustrating an example (an operation mode 3) of a blinking range of LEDs. The "operation mode 3" is a mode in which an LED corresponding to the specified port and an LED corresponding to a port coupled to the specified port within the same device are blinked. In what follows, a port coupled to the specified port within the same device is called a related port.

According to the "operation mode 3", as illustrated in FIG. 9, in a case where the operator selects, as the specified port, the port 15c of the switch 10, the switch 10 blinks the LED 16c corresponding to the port 15c and the LED 16f corresponding to the port 15f coupled to the port 15c within the switch 10. According to the "operation mode 3", the operator is able to identify the position of the specified port and the position of a port coupled to the specified port within the same device.

FIG. 10 is a diagram illustrating an example (an operation mode 4) of a blinking range of LEDs. The "operation mode 4" is a mode in which an LED corresponding to the specified port, an LED corresponding to a port of a peripheral device, the port of the peripheral device serving as a connection destination of the specified port, an LED corresponding to a related port coupled to the specified port within the same device, and an LED corresponding to a port on a peripheral device's side, which serves as a connection destination of the related port.

According to the "operation mode 4", as illustrated in FIG. 10, in a case where the operator selects, as the specified port, the port 15c of the switch 10, the switch 10 blinks the LED 16c corresponding to the port 15c and the LED 46c corresponding to the port 45c of the HBA 40a, which serves as the connection destination of the port 15c. Furthermore, the switch 10 blinks the LED 16f corresponding to the port 15f coupled to the port 15c within the switch 10 and the LED 56a corresponding to the port 55a of the storage device 50, which serves as the connection destination of the port 15f. According to the "operation mode 4", the operator is able to identify the position of the specified port, the position of a port on a peripheral device's side, the port on the peripheral device's side being to be coupled to the specified port, the position of a related port coupled to the specified port within the same device, and the position of a port on a peripheral device's side, the port on the peripheral device's side being to be coupled to the related port.

Next, an information processing method based on the switch 10 in a case where the switch 10 receives a blinking instruction command from the terminal device 30 will be described.

Figure 11:
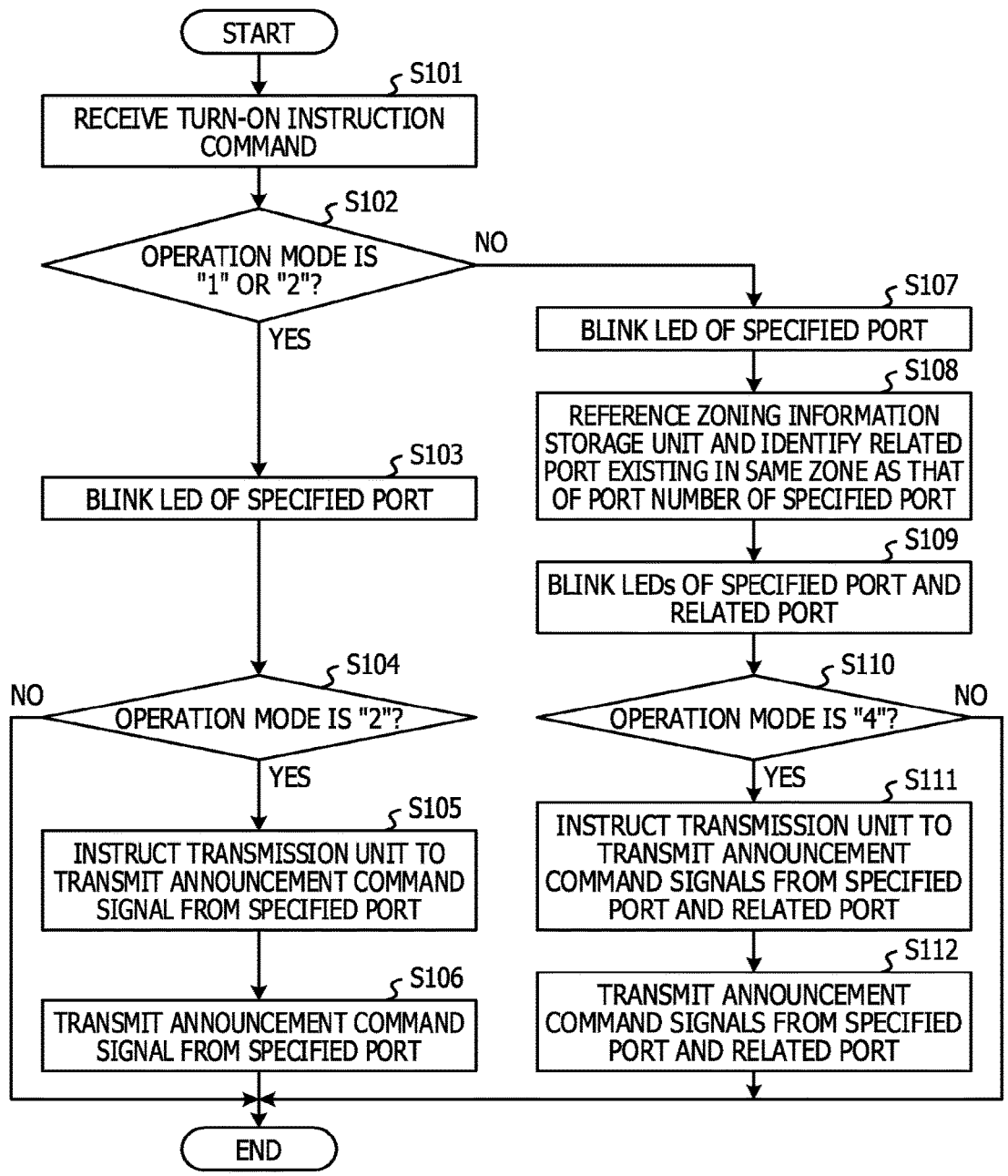
FIG. 11 is a flowchart illustrating an example of an information processing method based on a first switch in a case where the first switch receives a blinking instruction command from a terminal device in the first example.

FIG. 11 is a flowchart illustrating an example of the information processing method based on the switch 10 in a case where the switch 10 receives a blinking instruction command from the terminal device 30 in the first example.

First, the reception unit 11 in the switch 10 receives a blinking instruction command from the transmission unit 31 in the terminal device 30 (S101). The blinking instruction command includes information of a specified port within the switch 10 and information of an operation mode. As illustrated by (a) in FIG. 6, the reception unit 11 transfers the received blinking instruction command to the control unit 12.

Next, with reference to information included in the blinking instruction command, the control unit 12 determines whether or not the operation mode is "1" or "2" (S102). In a case where it is determined that the operation mode is "1" or "2" (S102: affirmative), the control unit 12 blinks the LED of the specified port within the switch 10 (S103). At this time, if it is confirmed that no cable is coupled to the specified port in a case where a cable is supposed to be coupled to the specified port, the operator is able to recognize an incorrect connection.

After the processing operation in S103, the control unit 12 determines whether or not the operation mode is "2" (S104). In a case where it is not determined that the operation mode is "2" (S104: negative), the processing is terminated. On the other hand, in a case where it is determined that the operation mode is "2" (S104: affirmative), the control unit 12 issues, to the transmission unit 13, a transmission instruction for transmitting an announcement command signal from the specified port (S105). The transmission unit 13 that receives the transmission instruction from the control unit 12 transmits the announcement command signal from the specified port in accordance with the transmission instruction (S106). In other words, the announcement command signal turns out to be transmitted, via a cable coupled to the specified port, to the connection destination of the cable. The announcement command signal transmitted from the transmission unit 13 may include information of the specified port within the switch 10 and the operation mode. From this, a series of processing operations in a case where it is determined that S102 is affirmative finishes.

On the other hand, in a case where, in S102, it is not determined that the operation mode is "1" or "2" (S102: negative), it is determined that the operation mode is "3" or "4". In addition, as illustrated by (b) in FIG. 6, the control unit 12 blinks the LED of the specified port (S107). At this time, in the same way as the processing operation in S103, if it is confirmed that no cable is coupled to the specified port in a case where a cable is supposed to be coupled to the specified port, the operator is able to recognize an incorrect connection.

Next, the control unit 12 references the zoning information stored in the zoning information storage unit 14 and identifies a related port existing in the same zone as that of the port number of the specified port (S108).

Next, as illustrated by (b) in FIG. 6, the control unit 12 blinks an LED corresponding to the related port identified in S108 (S109). Based on the processing operation in S109, the operator is able to visually confirm whether or not the position of the identified related port is the same as the position of the related port, expected by the operator. In addition, in a case where it is determined that the position of the identified related port is different from the position of the related port, expected by the operator, the operator is able to recognize an incorrect connection. If it is confirmed that the position of the related port is the same as the position of the related port, expected by the operator, and no cable is coupled to the related port in a case where a cable is expected to be coupled to the relevant related port, the operator is able to recognize an incorrect connection.

Next, the control unit 12 determines whether or not the operation mode is "4" (S110). In a case where it is not determined that the operation mode is "4" (S110: negative), the processing is terminated. On the other hand, in a case where it is determined that the operation mode is "4" (S110: affirmative), the control unit 12 instructs the transmission unit 13 to transmit announcement command signals from the specified port and the related port, as illustrated by (c) in FIG. 6 (S111).

As illustrated by (c) in FIG. 6, the transmission unit 13 that receives the transmission instruction from the control unit 12 transmits the respective announcement command signals from the specified port and the related port in accordance with the transmission instruction (S112). In other words, the announcement command signals turn out to be transmitted, via cables coupled to the specified port and the related port, to the connection destinations of the cables. In the same way, the announcement command signals transmitted from the transmission unit 13 each include information of the specified port within the switch 10 and the operation mode. From this, a series of processing operations in a case where it is determined that S102 is negative finishes.

Next, an information processing method based on the HBA 40 in a case where the HBA 40 receives an announcement command signal from the switch 10 will be described.

Figure 12:
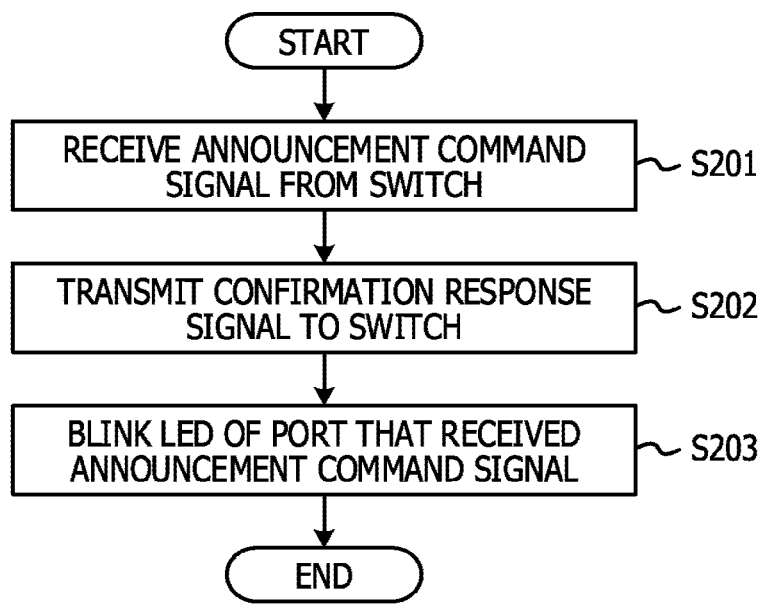
FIG. 12 is a flowchart illustrating an example of an information processing method based on an HBA in a case where the HBA receives an announcement command signal from the first switch in the first example.

FIG. 12 is a flowchart illustrating an example of the information processing method based on the HBA 40 in a case where the HBA 40 receives an announcement command signal from the switch 10 in the first example.

First, the reception unit 41 in the HBA 40 receives an announcement command signal from the transmission unit 13 in the switch 10 (S201). The announcement command signal includes information of a specified port within the switch 10 and information of an operation mode. The reception unit 41 transmits, to the transmission unit 13 in the switch 10 serving as the transmission source of the announcement command signal, a confirmation response signal for giving notice to the effect that the announcement command signal is received (S202). This confirmation response signal is realized by, for example, a frame. In addition, the reception unit 41 transfers the received announcement command signal to the control unit 42. In a case where it is difficult to receive the confirmation response signal from the reception unit 41, the transmission unit 13 retransmits the announcement command signal to the reception unit 41. In addition, in a case where the number of times retransmission is performed exceeds a predetermined number of times, the switch 10 may transmit, to the terminal device 30, a notice to the effect that it is difficult to transmit to the HBA 40.

Next, the control unit 42 blinks an LED corresponding to a reception port that received the announcement command signal (S203). From this, a series of processing operations, based on the HBA 40, in a case of the operation mode 2 or in a case where it is determined that S102 is negative finishes. Based on the processing operation in S203, the operator is able to visually confirm whether or not a reception port corresponding to the blinked LED is the same as the position of the reception port, expected by the operator. In addition, in a case where it is determined that a reception port corresponding to the blinked LED is different from the position of the reception port, expected by the operator, the operator is able to recognize an incorrect connection.

While processing performed by the HBA 40 that receives the announcement command signal is described, the storage devices 50 and 60 that receive announcement command signals are able to perform the same processing based on FIG. 12. Each of the switch 10, the HBA 40, and the storage devices 50 and 60 is able to use reception of an announcement command signal for turning off an LED or detection of truncation of a link (link-down) as a trigger to turn off the LED while reception of an announcement command signal serves as a trigger to blink the LED. In addition, the LED is turned off, thereby enabling to announce, in a visually confirmable manner, that the LED is not blinked. "Blink" within the flowcharts illustrated in FIG. 11 to FIG. 13 are replaced with "turn off" and approximately the same processing is performed, thereby enabling to perform processing for turning off an LED.

Next, an information processing method based on the switch 20 in a case where the switch 20 receives an announcement command signal from the switch 10 will be described.

Figure 13:
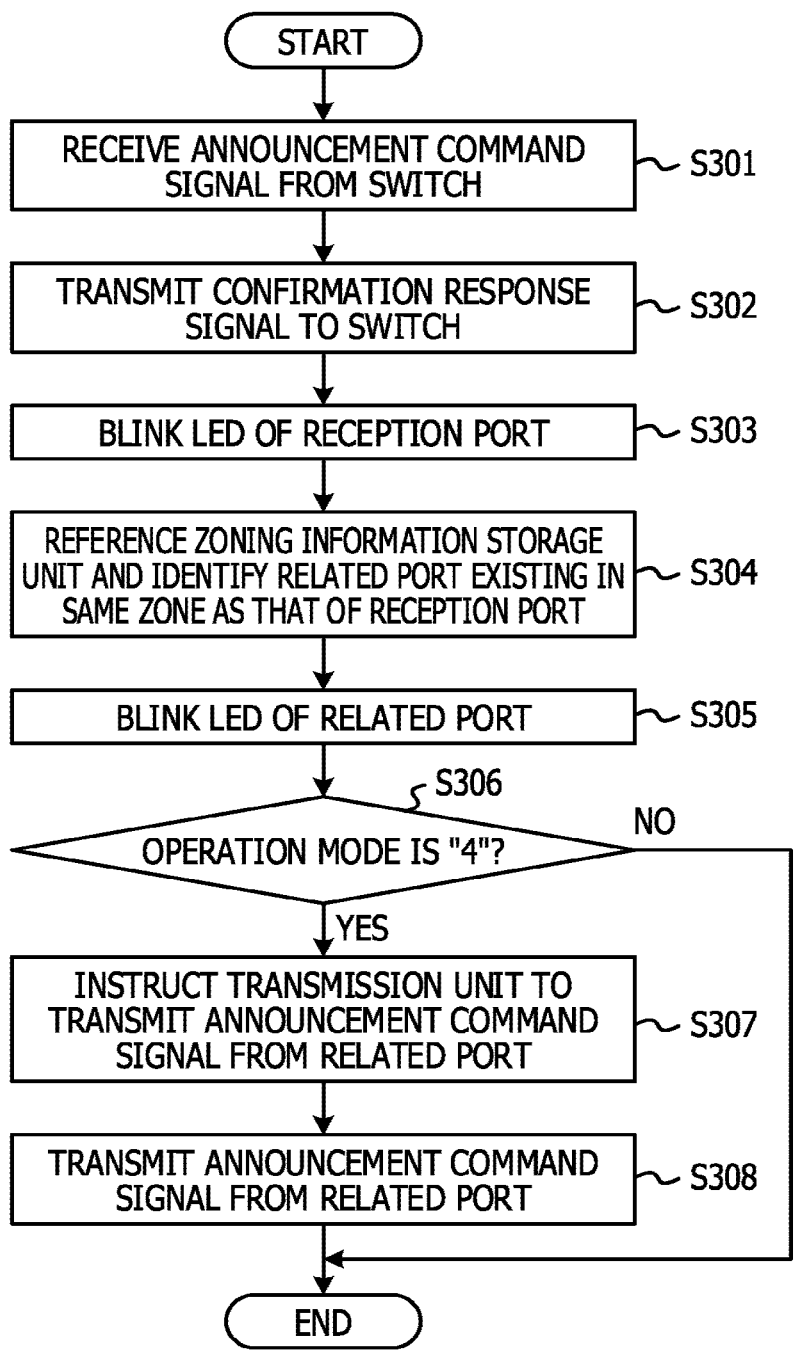
FIG. 13 is a flowchart illustrating an example of an information processing method based on a second switch in a case where the second switch receives an announcement command signal from the first switch in the first example.

FIG. 13 is a flowchart illustrating an example of the information processing method based on the switch 20 in a case where the switch 20 receives an announcement command signal from the switch 10 in the first example.

First, the reception unit 21 in the switch 20 receives an announcement command signal from the transmission unit 13 in the switch 10 (S301). The announcement command signal includes information of a specified port within the switch 10 and information of an operation mode. As illustrated by (d) in FIG. 6, the reception unit 21 transmits, to the transmission unit 13 in the switch 10 serving as a transmission destination, a confirmation response signal for giving notice to the effect that the announcement command signal is received (S302). In addition, the reception unit 21 transfers the received announcement command signal to the control unit 22.

Next, as illustrated by (e) in FIG. 6, the control unit 22 blinks an LED corresponding to a reception port that received the announcement command signal (S303).

Next, as illustrated by (e) in FIG. 6, the control unit 22 references the zoning information storage unit 24 and identifies a related port existing in the same zone as that of the port number of the reception port (S304). As described above, the switch 20 includes, in the zoning information storage unit 24, the same zoning information as the zoning information included in the switch 10. Therefore, using the zoning information included in the switch 20, the control unit 22 is able to identify a related port of the switch 20, which has a connection relationship with a specified port of the switch 10.

Next, as illustrated by (e) in FIG. 6, the control unit 22 blinks an LED corresponding to the related port (S305).

Next, the control unit 22 references information included in the announcement command signal and determines whether or not the operation mode is "4" (S306). In a case where it is determined that the operation mode is not "4" (S306: negative), it is determined that the operation mode is "3", and a series of processing operations performed by the switch 20 that received the announcement command signal finishes. Based on the processing operation in S305, in the same way as the processing operation in S109, in a case where it is determined that the position of the identified specified related port is different from the position of the related port, expected by the operator, the operator is able to recognize an incorrect connection. If it is confirmed that the position of the related port is the same as the position of the related port, expected by the operator, and no cable is coupled to the related port in a case where a cable is expected to be coupled to the relevant related port, the operator is able to recognize an incorrect connection. On the other hand, in a case where it is determined that the operation mode is "4" (S306: affirmative), the control unit 22 instructs the transmission unit 23 to transmit an announcement command signal from the related port (S307).

The transmission unit 23 that receives the transmission instruction from the control unit 22 transmits the announcement command signal from the related port in accordance with the transmission instruction (S308). The announcement command signal turns out to be transmitted, via a cable coupled to the related port, to the connection destination of the cable. The announcement command signal transmitted from the transmission unit 23 may include information of the specified port within the switch 10 and the operation mode. From this, a series of processing operations performed by the switch 20 that received the announcement command signal finishes.

In a case where the destination of the announcement command signal transmitted by the processing operation in the S308 is an HBA or a storage device, the relevant HBA or storage device turns out to perform processing in accordance with the flow illustrated in FIG. 12. On the other hand, in a case where the destination of the announcement command signal is a switch, the relevant switch turns out to perform processing again in accordance with the flow illustrated in FIG. 13.

In such a manner as described above, it is possible to perform the processing based on the information processing system.

According to the present embodiment, by referencing the zoning information, it is possible for the operator to identify a related port coupled to a specified port. It is possible for the operator to identify facing ports serving as other ports to which the specified port and the related port are individually coupled using cables. In addition, by blinking identified individual ports, it is possible for the operator to visually understand an actual connection state serving as a confirmation target at the time of confirming the presence or absence of an incorrect connection while not separately tracing and confirming cables.

According to the present embodiment, it is possible to spread the blinking range of LEDs from the inside of a switch to a peripheral device coupled to the switch. Therefore, it becomes possible for the operator to visually confirm a wider range of connection states of cables by blinking LEDs. As a result, it is possible to easily confirm the presence or absence of an incorrect connection after connecting using cables.

Second Example

Next, a second example will be described. In the first example, a switch performs processing for blinking an LED of the information processing system, the processing being triggered by a blinking instruction command received from a terminal device by the switch. On the other hand, the second example is characterized in that processing for blinking an LED of an information processing system is performed, the processing being triggered by a blinking instruction command received from a terminal device by an HBA.

Figure 14:
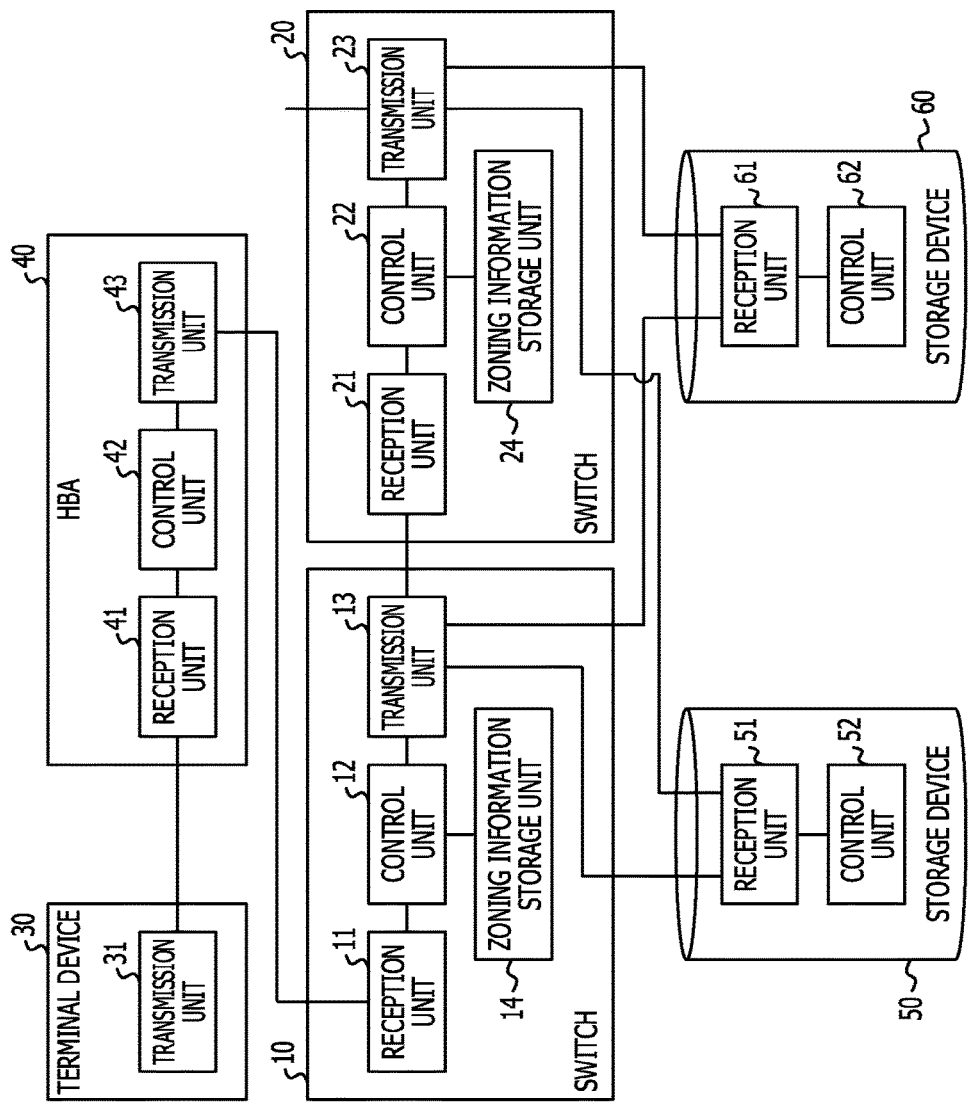
FIG. 14 is a diagram illustrating an example of a configuration of an information processing system according to a second example.

FIG. 14 is a diagram illustrating an example of a configuration of the information processing system according to the second example. The description of a symbol illustrated in FIG. 14 and equal to a symbol in FIG. 1 will be omitted. As a connection configuration of the information processing system and the hardware configurations of the switches 10 and 20, used for realizing the second example, individual configuration exemplified in FIG. 2 and FIG. 3 may be used. Therefore, the descriptions thereof will be omitted.

Figure 15:
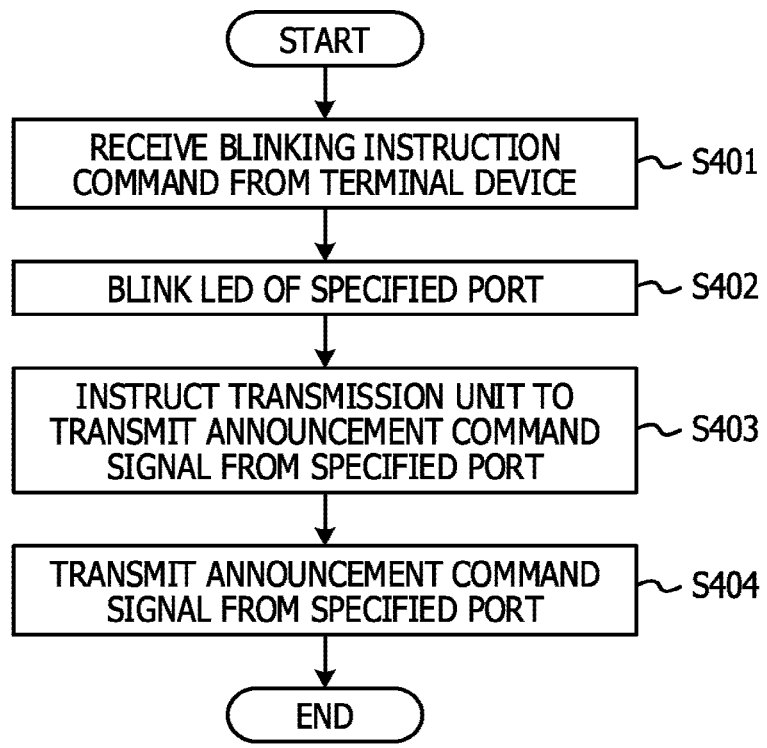
FIG. 15 is a flowchart illustrating an example of an information processing method based on the HBA in a case where the HBA receives a blinking instruction command from the terminal device in a second example.

FIG. 15 is a flowchart illustrating an example of an information processing method based on the HBA 40 in a case where the HBA 40 receives a blinking instruction command from the terminal device 30 in the second example. Hereinafter, an example of the information processing method will be described with reference to FIG. 14 and FIG. 15.

First, the reception unit 41 in the HBA 40 receives a blinking instruction command from the terminal device 30 of the operator (S401). In the same way as in the first example, the blinking instruction command is transmitted from the transmission unit 31 in the terminal device 30 and reaches the reception unit 41. In the second example, one of ports provided in the HBA 40 is specified as a specified port by the operator. Therefore, the blinking instruction command includes information of the specified port within the HBA 40 and information of an operation mode.

In the second example, an LED corresponding to the specified port within the HBA 40 turns out to be blinked. Therefore, the operation modes 1 and 3 in which the blinking range is limited to only the LEDs of a switch are dropped from choices of the operator, and the operator selects one of the operation mode 2 and 4. The reception unit 41 transfers the received blinking instruction command to the control unit 42.

Next, the control unit 42 references information included in the blinking instruction command and blinks the LED of the specified port within the HBA 40 (S402).

After the processing operation in S402, the control unit 42 instructs the transmission unit 43 to transmit an announcement command signal from the specified port (S403). The transmission unit 43 that receives the transmission instruction from the control unit 42 transmits the announcement command signal from the specified port in accordance with the transmission instruction (S404). The announcement command signal turns out to be transmitted, via a cable coupled to the specified port, to the connection destination of the cable. The announcement command signal transmitted from the transmission unit 43 may include information of the specified port within the HBA 40 and the operation mode. From the above, a series of processing operations based on the HBA 40 that received the blinking instruction command finishes.

Next, processing performed by the switch 10 in a case where the switch 10 receives an announcement command signal from the HBA 40 will be described.

Figure 16:
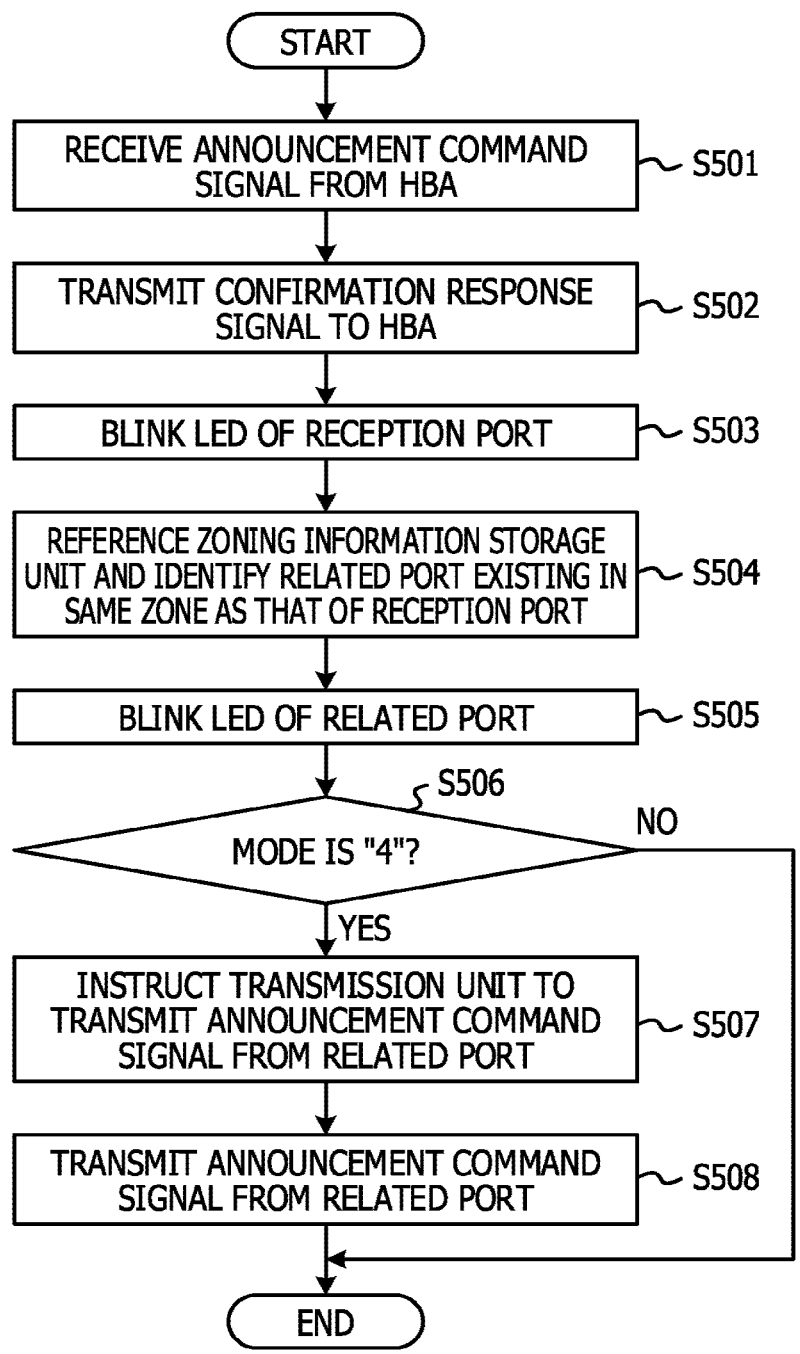
FIG. 16 is a flowchart illustrating an example of an information processing method based on a switch in a case where the switch receives an announcement command signal from the HBA in the second example.

FIG. 16 is a flowchart illustrating an example of an information processing method based on the switch 10 in a case where the switch 10 receives an announcement command signal from the HBA 40 in the second example.

First, the reception unit 11 in the switch 10 receives an announcement command signal from the transmission unit 43 in the HBA 40 (S501). The announcement command signal includes information of a specified port within the HBA 40 and information of an operation mode. The reception unit 11 transmits, to the transmission unit 43 in the HBA 40 serving as a transmission destination, a confirmation response signal for giving notice to the effect that the announcement command signal is received (S502). In addition, the reception unit 11 transfers the received announcement command signal to the control unit 12.

Next, the control unit 12 blinks an LED corresponding to a reception port that received the announcement command signal (S503).

Next, the control unit 12 references the zoning information storage unit 14 and identifies a related port existing in the same zone as that of the port number of the reception port (S504).

After identifying the related port, the control unit 12 blinks an LED corresponding to the related port (S505).

Next, the control unit 12 references information included in the announcement command signal and determines whether or not the operation mode is "4" (S506). In a case where it is determined that the operation mode is not "4" (S506: negative), it is determined that the operation mode is "3", and a series of processing operations performed by the switch 10 that received the announcement command signal finishes. Based on the processing operation in S505, in a case where no cable is coupled to the related port corresponding to the blinked LED, the operator is able to recognize an incorrect connection. On the other hand, in a case where it is determined that the operation mode is "4" (S506: affirmative), the control unit 12 instructs the transmission unit 13 to transmit an announcement command signal from the related port (S507).

The transmission unit 13 that receives the transmission instruction from the control unit 12 transmits the announcement command signal from the related port in accordance with the transmission instruction (S508). The announcement command signal turns out to be transmitted, via a cable coupled to the related port, to the connection destination of the cable. The announcement command signal transmitted from the transmission unit 13 may include information of the specified port within the HBA 40 and the operation mode. From this, a series of processing operations performed by the switch 10 that received the announcement command signal finishes.

In a case where the destination of the announcement command signal transmitted by the processing operation in the S508 is a storage device, the relevant storage device is able to perform processing in accordance with the flow illustrated in FIG. 12. On the other hand, in a case where the destination of the announcement command signal transmitted by the processing operation in S508 is a switch, the relevant switch is able to perform processing in accordance with the flow illustrated in FIG. 13.

According to the present embodiment, the announcement command signal is transmitted from a specified port of the HBA 40 to the switch 10. Therefore, based on the zoning information included in the switch 10, it is possible to blink all ports existing on an actual connection path beginning at the specified port of the HBA 40. As a result, after connecting using a cable, it is possible to easily confirm the presence or absence of an incorrect connection.

While desirable examples of the present technology are described in detail as above, the present technology is not limited to a specific example and may be variously modified or altered. While, in the present embodiment, an example in which an LED is blinked is described, the LED may be, for example, turned on instead of being blinked. Alternatively, the terminal device 30 in FIG. 1 may select one of blinking and turn-on modes at the time of inputting a blinking instruction command.

While, in the present embodiment, a light source such as an LED is exemplified as the announcement unit, the announcement unit is not limited to the light source if being an indicator for announcing the position of a port in a visually confirmable manner. In addition, an indicator that displays, using, for example, a message, information to the effect that a cable is coupled or no cable is coupled may be used. Alternatively, for example, symbols or numeric characters, which correspond to respective states including a state in which a cable is coupled and a state in which no cable is coupled, may be preliminarily set, and it is possible to display the symbols or numeric characters.

In FIG. 1, information of ports identified based on the processing of the present embodiment may be collected by the switch 10, and the collected information may be transmitted from the switch 10 to the terminal device 30. This processing may be performed in accordance with, for example, the following procedure.

First, in a case where a blinking range specified by the terminal device 30 is the "operation mode 4", the switch 10 collects pieces of information of a specified port, a related port, a reception port of an announcement command signal of the HBA 40, and a reception port of an announcement command signal of the storage device 50. At this time, by receiving pieces of information from the HBA 40 and the storage device 50, the switch 10 is able to acquire information of reception ports. Next, the switch 10 transmits the collected information of ports from the switch 10 to the terminal device 30. In addition, the terminal device 30 that receives the information of reception ports displays the relevant information on a display device provided in the device itself. According to this method, it becomes possible for the operator of the terminal device 30 to detect the presence or absence of an incorrect connection without confirming an actual connection state of a cable.

A computer program, which causes a computer to perform the above-mentioned information processing apparatus and information processing method, and a computer-readable recording medium recording therein the program are included in the scope of the present technology. Here, examples of the computer-readable recording medium include a flexible disk, a hard disk, a compact disc-read only memory (CD-ROM), a magneto optical disk (MO), a digital versatile disc (DVD), a DVD-read only memory (DVD-ROM), a DVD-random access memory (DVD-RAM), a Blu-ray (registered trademark) disc (BD), and a semiconductor memory. The above-mentioned computer program is not limited to a computer program recorded in one of the above-mentioned recording media and may be a computer program transmitted via an electric communication line, a wireless or wired communication line, or a network or the like typified by the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system, comprising:
a terminal device; and
a first information processing apparatus that includes:
  a plurality of first ports including a first reception port;
  a plurality of first light sources respectively corresponding to one of the plurality of first ports;
  a first memory that stores first zoning information including connection information of the plurality of first ports; and
  a first processor coupled to the first memory and configured to:
    receive, by the first reception port, a blinking range of light sources to be blinked and a specified port among the plurality of first ports from the terminal device;
    identify, when the blinking range includes a light source corresponding to the specified port and a light source corresponding to a first related port coupled to the specified port, the first related port from among the plurality of first ports based on the first zoning information; and
    blink the light source corresponding to the specified port and the light source corresponding to the first related port.

2. The information processing system according to claim 1, wherein the zoning information includes a plurality of zones respectively indicating a combination of a plurality of identifiers of ports having connecting relationship among the plurality of first ports.

3. The information processing system according to claim 1, further comprising:
a second information processing apparatus that includes:

a plurality of second ports including a second reception port coupled to the specified port of the first information processing apparatus;

a plurality of second light sources respectively corresponding to one of the plurality of second ports;

a second memory that stores second zoning information including connection information of the plurality of second ports; and a second processor coupled to the second memory, wherein the first processor is configured to transmit a request frame from the specified port to the second reception port, when the blinking range includes a light source corresponding to the second reception port, and the second processor is configured to:

receive the request frame by the second reception port, and blink the light source corresponding to the second reception port.

4. The information processing system according to claim 3, wherein the second processor is configured to:

identify, when the blinking range includes a light source corresponding to the second reception port and a light source corresponding to a second related port couple to the second reception port, the second related port from among the plurality of second ports based on the second zoning information, and blink the light source corresponding to the second reception port and the light source corresponding to the second related port.

5. The information processing system according to claim 3, wherein the first zoning information and the second zoning information are synchronized with each other between the first information processing apparatus and the second information processing apparatus so as to be identical information.

6. The information processing system according to claim 4, further comprising:

a third information processing apparatus that includes:

a plurality of third ports including a third reception port coupled to the first related port of the first information processing apparatus;

a plurality of third light sources respectively corresponding to one of the plurality of third ports;

a third memory that stores third zoning information including connection information of the plurality of third ports; and a third processor coupled to the third memory, wherein the first processor is configured to, when the blinking range includes the light source corresponding to the specified port, the light source corresponding to the first related port, the light source corresponding to the second reception port and a light source corresponding to the third reception port:

blink the light source corresponding to the specified port and the light source corresponding to the first related port; and transmit the request frame from the specified port and the first related port, and the second processor is configured to:

receive the request frame by the second reception port; and blink the light source corresponding to the second reception port, and the third processor is configured to:

receive the request frame by the third reception port; and blink the light source corresponding to the third reception port.

7. An information processing method executed by an information processing system that includes a terminal device and an information processing apparatus that includes a plurality of ports including a reception port, a plurality of light sources respectively corresponding to one of the plurality of ports, and a processor, the information processing method comprising:

receiving, by the reception port, a blinking range of light sources to be blinked and a specified port among the plurality of ports from the terminal device;

identifying, by the processor when the blinking range includes a light source corresponding to the specified port and a light source corresponding to a related port coupled to the specified port, the related port from among the plurality of ports based on zoning information including connection information of the plurality of ports; and blinking, by the processor, the light source corresponding to the specified port and the light source corresponding to the related port.

8. A non-transitory computer-readable recording medium that causes an information processing apparatus to execute a process, the information processing apparatus including a plurality of ports including a reception port, and a memory configured to store therein zoning information indicating a connection relationship between the plurality of ports, the process comprising:

receiving, by the reception port, a blinking range of light sources to be blinked and a specified port among the plurality of ports from a terminal device;

identifying, when the blinking range includes a light source corresponding to the specified port and a light source corresponding to a related port coupled to the specified port, the related port from among the plurality of ports based on the zoning information; and blinking the light source corresponding to the specified port and the light source corresponding to the related port.

9. The information processing system according to claim 3, wherein the first processor is configured to transmit an updated information of the first zoning information to a second information processing apparatus at predetermined time intervals, and the second processor is configured to update the second zoning information by using the updated information so that the second zoning information becomes identical to the updated first zoning information.

* * * * *